United States Patent [19]
Cooper

[11] Patent Number: 4,512,441
[45] Date of Patent: Apr. 23, 1985

[54] BLOWDOWN FITTING

[75] Inventor: Jack M. Cooper, Houston, Tex.

[73] Assignee: General Screw Products Company, Houston, Tex.

[21] Appl. No.: 392,753

[22] Filed: Jun. 28, 1982

Related U.S. Application Data

[63] Continuation-in-part of Ser. No. 124,444, Feb. 25, 1980, Pat. No. 4,347,915.

[51] Int. Cl.³ .................... F01M 1/18; F16N 21/06
[52] U.S. Cl. .................. 184/105 B; 137/539; 137/614.03; 137/614.2; 141/385; 184/105 C
[58] Field of Search .............. 184/6.4, 105 R, 105 A, 184/105 B, 105 C; 137/614, 614.02, 614.03, 614.05, 614.11–614.14, 614.2, 537, 539; 251/148, 149.4, 149.5, 149.8; 285/307, 308, 309, 322; 141/383, 384, 385, 386

[56] References Cited

U.S. PATENT DOCUMENTS

| | | | |
|---|---|---|---|
| 1,637,325 | 7/1927 | Jacques | 184/105 C |
| 1,799,433 | 4/1931 | Murphy | 184/105 B |
| 2,400,817 | 5/1946 | Fox et al. | 184/105 B |
| 2,554,252 | 11/1948 | Heim | 184/105 B |
| 2,719,605 | 10/1955 | Piquerez | 184/105 B |
| 2,761,468 | 9/1956 | Thatcher | 137/539 |
| 2,788,088 | 4/1957 | Weston | 184/105 B |
| 2,918,084 | 12/1959 | Madar et al. | 184/105 B |
| 3,437,082 | 4/1969 | Bouwkamp et al. | 137/539 X |
| 3,605,948 | 9/1971 | Wynn | 184/6.4 |
| 3,972,387 | 8/1976 | Braun | 184/105 B X |
| 4,009,729 | 3/1977 | Vik | 137/614.11 X |
| 4,347,915 | 9/1982 | Cooper | 184/105 B |
| 4,351,414 | 9/1982 | Merten | 184/105 B |

FOREIGN PATENT DOCUMENTS 1115975  5/1956  France .

Primary Examiner—David H. Brown
Assistant Examiner—John E. Griffiths, Jr.
Attorney, Agent, or Firm—Carwell & Helmreich

[57] ABSTRACT

An improved grease fitting of the type generally referred to as a blowdown fitting is provided, including a plurality of sealing means which enables lubricant to be safely injected into the lubricant supply system. An upper body is rotatable with respect to the main body, and pressure may be vented through a cap threaded to the upper body. A stinger assembly is rotatable with respect to both main body and the upper body, which enhances the life of the seal between the stinger and the main body. A sealing ball is provided between the stinger assembly and the cone, and is biased toward its seating surface by a spring adapted to enable a lubricant/polyester plasticizer mixture to pass through the fitting.

20 Claims, 5 Drawing Figures

BLOWDOWN FITTING

RELATED CASES

This application is a continuation-in-part of U.S. Ser. No. 124,444, filed Feb. 25, 1980, which issued as U.S. Pat. No. 4,347,915 on Sept. 7, 1982.

BACKGROUND OF THE INVENTION

This invention relates to a blowdown grease fitting, and more particularly, to an improved blowdown fitting having a longer seal life and one adapted for use in applications where a lubricant and polyester plasticizer are injected through the fitting.

Blowdown type grease fittings are commonly used in large lubricant supply systems, and are generally intended to retain lubricant under high pressure within the system. Blowdown fittings typically include a plurality of sealing means, which enables high pressure within the body of the fitting to be bled off before injecting additional lubricant through the valve. A typical blowdown fitting is described, for example, in U.S. Pat. No. 3,605,948 to R. O. Wynn.

Prior art blowdown fittings have several substantial drawbacks. First, the primary sealing member is typically secured to a first body portion which, in turn, is threaded to a second body portion containing a primary sealing seat. Thus, the sealing member is rotated with respect to a seat as the seal is formed. It has been found that seals within such blowdown fittings may experience a short life before the seal starts to leak.

The reason for such poor life in prior art blowdown fitting seals is not entirely clear. It is believed, however, that seal life is detrimentally affected since the conical-shaped primary sealing member is fixed relative to the upper body of the fitting. As the seal is being made up by threading the upper body to the main body, any eccentricity of the conical-shaped member relative to the seat can cause galling of the sealing member or the seat. Also, the annular position of the sealing member with respect to the seat is fixed when in the sealed condition, so that any wear points on the surface of the sealing member or the seat will be in the same position although the seal is repeatedly opened and reclosed.

Prior art blowdown fittings are difficult to manufacture and expensive to repair. A primary sealing member is typically provided on an elongated stinger assembly which is part of the upper body. If the primary sealing member corrodes or otherwise must be replaced, a new stinger assembly and upper body must generally be replaced. Moreover, manufacture of the upper body and an integral stinger assembly is difficult and time-consuming.

A further problem with prior art blowdown fittings is that a poor seal may occur between the fitting and the female portion of the device to be lubricated. A cone member may be provided in the fitting for engagement with the female portion of the device to be lubricated, but galling of the cone member may occur as the blowdown fitting is threaded to the device.

Another problem with conventional grease fittings is that they frequently rupture when a grease/polyester mixture is passed through the fitting. In recent years, it has become common to use grease not only for a lubricant, but also as a carrier of plastic particles designed to act as a sealer or a packing material. The packing material, such as Teflon TM or graphite impregnated asbestos, acts to some extent as a lubricant, but is principally intended to seal that area and make up dimensional variations between the rotational and stationary members of the general assembly being lubricated. Since the packing material may tend to disintegrate during continued operations, it has been found necessary to repack pumps and valves on a regular basis. Rather than dismembering the assembly for repacking, it has been found acceptable in many applications to inject grease and a packing-type material to the desired area. Regular injection of the grease/packing material composition replenishes the packing in the assembly and offers an efficient technique for substantially reducing both equipment down time and maintenance costs.

Some commercial high pressure grease fittings have a metallic ball which is acted upon by a spring and normally engages a seat to seal the grease within the fitting and the mechanical assembly. When a grease gun is attached to the fitting, the pressure of the injected grease unseats the ball and allows grease to enter the fitting and a passageway from the fitting to the desired place within the assembly. Movement of the ball away from the seat typically compresses the spring, and grease is allowed to flow between the ball and the internal walls of the fitting.

A problem has repeatably been encountered with the use of conventional grease fittings and grease/packing material mixtures. The packing material particles may become lodged between the ball and the internal wall of the fitting, so that the fitting becomes "plugged" and further passage of the mixture is not possible. When a fitting becomes plugged, the pressure from the gun is often increased in an attempt to "clear" the fitting. The pressure within the fitting is often increased, however, to the extent that the fitting "blows out". During blow-out of the fitting, the high pressure buildup in the fitting causes a spring retainer to give way, so that the ball and spring can be expelled from the fitting.

The possible detrimental effects of a plugged or blown-out fitting are numerous. Additional lubricant may not be injected through a plugged fitting, so that the packing may deteriorate, causing a leak. Alternatively, the surfaces in the area of the packing may become scoured or otherwise damaged because the packing is not being replaced. If the fitting blows out, the ball may not seat to hold the lubricant in the assembly. More serious, however, is the possibility that the spring, ball, or other portions of the fitting may be forced into the area of the packing and damage the equipment intended to be lubricated.

The disadvantages of the prior art are overcome by the present invention, however, and an improved grease fitting is hereinafter provided.

SUMMARY OF THE INVENTION

In an exemplary embodiment of the present invention, a blowdown grease fitting is provided comprising a main body, an upper body, and a vent cap. The passageway in the main body is adapted to receive a stinger assembly, a cone, and a ball and spring between the stinger assembly and the cone.

The stinger assembly is loosely retained by the upper body, and is axially movable and freely rotatable with respect to the upper body. As the upper body is threaded to the main body, the stinger assembly moves axially until a cone-shaped portion of the stinger assembly seals with the seating surface of the main body. Since the stinger assembly is rotatable with respect to the body, however, the cone-shaped portion need not rotate with respect to the seating surface as the seal is made, which prolongs the life of the metal-to-metal seal between the cone-shaped member and the seating surface.

The end of the fitting may be threaded for engagement with the general assembly to be lubricated, and the cone may be adapted for sealing engagement with a seating surface of the general assembly. The cone is retained within the main fitting body by a relatively thick lip, and the cone is also rotatable with respect to the main body.

A ball and spring are provided in a portion of the passageway of the main body between the stinger and the cone. The ball is adapted for engagement with a seat in the main body. The spring biases the ball towards the seat in the main body, and a leg of the spring engages the ball at a point along the axis of the passageway. The length of the leg is sufficient to engage the adjacent coil of the spring, so that the tip of the leg of the spring will not bend beyond the point of the adjacent coil of the spring.

The end of the spring in contact with the ball has a leg portion which passes through the central axis of the fitting. When desired, additional lubricant may be supplied to the general assembly through the fitting in the following manner. The grease gun may be attached to the end of the fitting protruding through the device. Grease, under pressure, is forced into the passageway of the fitting and into contact with the ball. As pressure is increased from the gun, the spring is compressed and the ball unseats, allowing lubricant to flow past the ball and into the general assembly. Since the leg of the spring acting against the ball passes through the axis of the passageway, the unseated ball shifts to one side of the passageway as it moves away from the seat. Since the ball has shifted out of alignment with the passageway, lubricant may flow past the ball with less resistance. When a sufficient amount of grease has been added, the gun may be removed from the fitting and the pressure of the lubricant within the general assembly, in addition to the force of the spring, returns the ball to its normal seated position against the seat.

It is a feature of the present invention to provide a blowdown fitting with seals having an improved life.

It is another feature of the invention to provide a fitting having a sealing member carried by an upper body and freely rotatable with respect to the upper body.

It is a further feature of the present invention of providing an improved fitting having a cone rotatable with respect to the body of the fitting.

Still another feature of the present invention is to provide a grease fitting which is less susceptible to being plugged by high viscosity lubricant.

Another feature of this invention is to provide a grease fitting in which the sealing members are less likely to be blown-out of the fitting.

A further feature of the invention is to provide an improved grease fitting which may be used in conjunction with a grease/polyester plasticizer mixture.

Still another feature of the present invention is to provide a grease fitting having a plurality of sealing members which may be easily manufactured and replaced in a worn fitting.

These and other features and advantages of this invention will become apparent from the foregoing detailed description, wherein reference is made to the figures in the accompanying drawings.

DETAILED DESCRIPTION

Figure 1:
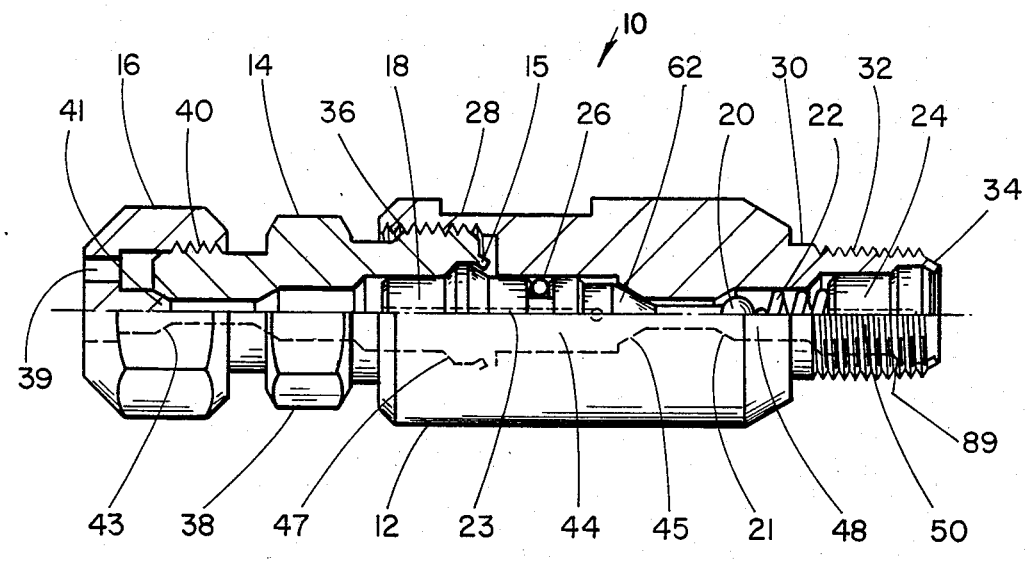
FIG. 1 is a pictorial representation, partly in cross-section, of an exemplary embodiment of the present invention in the closed position.

FIG. 1 is a pictorial representation, partly in cross-section, of one embodiment of a blowdown fitting 10 according to the present invention. A main body member 12 is provided for threading engagement with a suitable general assembly to be lubricated. An upper body 14 and a vent cap 16 are also provided, and will be explained in detail below. The main body 12 includes a passageway 44 for the passage of lubricant through the fitting, and a valve assembly or stinger assembly 18 is provided in a portion of the passageway. The passageway through the main body 12 also includes passageway portion 48, which accommodates a steel ball 20 and spring 22. Finally, the passageway includes expanded passageway portion 50, which is designed to accommodate the fitting tip member or cone member 24 having a central passageway 87 through the center of the cone member.

The blowdown fitting 10 includes a plurality of sealing means. A conical-shaped portion 62 of the stinger assembly 18 is designed for engagement with seating surface 45 of the main body, and forms the primary seal for the fitting in the closed position. The lip 34 has been crimped over the cone 24 to hold the cone 24 within the main body, and a metal-to-metal seal may be formed between the cone 24 and the seating surface 89 on the main body. The ball member 20 may also form a seal with the seating surface 21 of the main body, O-ring assembly 26 forms a sealing surface between the stinger assembly and the side wall of the passageway 44 of the main body 12, and the stinger assembly 18 forms a sealing surface with the seating surface 47 on the upper body. Finally, the conical-shaped valve projection 41 of the cap 16 is adapted for sealing engagement with the seating surface 43 of the upper body 14, thereby forming a backup seal for the fitting in the closed position.

The blowdown fitting shown in FIG. 1 is shown in its closed position, i.e., in its position for retaining lubricant within the general assembly to be lubricated. It will be assumed, therefore, that threads 32 of the main body are tapered pipe thread, which have been threaded to a suitable general assembly. Threads 32 have been formed on the reduced diameter portion 30 of the main body, and portion 30 has a diameter approximately equal to or greater than the internal diameter of the threads 32. In order to assist threading of the main body to the general assembly, the main body may be provided with a hexagonal shaped portion 28 suitable for engagement with a conventional wrench.

The upper body 14 may similarly be provided with a hexagonal shaped portion 38 and contains threads 36 for threaded engagement with the main body 12. Similarly, the cap 16 is provided with threads 40 so that the cap may be threaded to the upper body 14. The cap includes one or more vent passageways 39 for venting fluid from the passageway 44, and a conical-shaped valve portion 41.

The blowdown fitting shown in FIG. 1 is acting to seal a lubricant within the general assembly. The cap 16 has been threaded to the upper body 14 so that the conical-shaped portion 41 of the cap 16 is in sealing engagement with the seating surface 43 of the upper body 14. The upper body 14, in turn, has been threaded to the main body 12 so that the conical-shaped portion 62 of the stinger assembly 18 is in seating engagement with the seating surface 45 of the main body 12. Since the portion 62 is in sealing engagement with the seating surface 45 and the upper body 14 is fully threaded to the main body 12, the stinger assembly may be pushed out of engagement with retaining lip 15. Because of the location of the stinger assembly 18 relative to the main body 12, the ball 20 is also moved out of engagement with the seating surface 21.

In the closed position as shown in FIG. 1, the blowdown fitting is provided with at least four positive sealing means to insure that the lubricant cannot escape from the blowdown fitting. The upper body 14 has been threaded to the main body 12, so that the conical portion 62 of the stinger assembly 18 forms a positive metal-to-metal seal with the seating surface 45 of the main body. The extended conical-shaped portion 41 of the cap 16 forms a metal-to-metal seal with the seating surface 43 of the upper body 14, since the cap 16 is threaded to its fullest extent onto the upper body 14. Passageway 23 through stinger assembly allows fluid to flow by the O-ring assembly, but the O-ring assembly 26 forms a third seal with the side walls of the passageway 44, and the stinger assembly and seating surface 47 form a fourth seal between the stinger assembly and the upper body. In its closed position as described above, the third and fourth sealing means prevent lubricant from entering the cavity 49 between the main body and the upper body, and thereby also prevent pressure loss between the main body and the upper body through the interstices of threads 36. In its closed position, therefore, four seals prevent loss of pressure from the general assembly, although the first seal between the main body and the stinger assembly is capable by itself of preventing loss of fluid or pressure from the general assembly.

Figure 2:
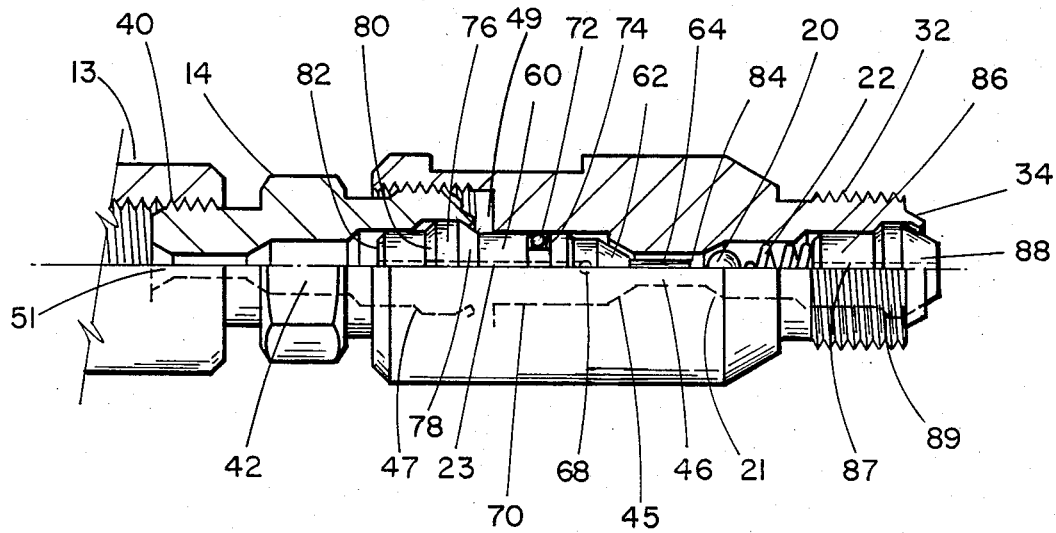
FIG. 2 is a pictorial representation, partly in cross-section, of another embodiment of the present invention in the open position.

FIG. 2 is a pictorial representation, partly in cross-section, of another embodiment of the present invention in the open position. The blowdown fitting shown in FIG. 2 is similar to the embodiment depicted in FIG. 1, and therefore the same numerical designations are used for similar components.

The fitting illustrated in FIG. 2 is in the open position, i.e., the position during which grease is inserted through the fitting and into the general assembly to be lubricated. In FIG. 2, the cap 16 has been removed, and it may be understood that the upper body 14 has been unthreaded several turns from the main body. The annular lip 15 on the upper body acts to retain the stinger assembly with the upper body, so that if the upper body is unthreaded partially or removed entirely from the main body, the stinger assembly will move with the upper body. The stinger assembly 18 is thereby axially moved, i.e., moved in the direction of the central axis of the fitting, so that a seal is no longer being made between the conical-shaped portion 62 and the seating surface 45 of the upper body. A lubricant supply adapter 13 may be threaded to the upper body by threads 40, and lubricant may be injected into the opening 51 and through passageway 42 of the upper body 14. It may be understood that the force of the lubricant on the end surface 82 of stinger assembly 18 will cause the stinger assembly to move axially toward the cone. Thus, when lubricant is injected through the fitting, the conical-portion 80 is no longer in engagement with the surface 47, and the force of the lubricant may cause the conical portion 78 to engage the annular lip 15 formed on the upper body 14.

A passageway 23 through the stinger assembly allows lubricant to flow past the O-ring assembly 26 and exit opening 68 adjacent the conical-shaped portion 62. As previously stated, portion 62 is no longer in engagement with the surface 45, so that lubricant may continue down restricted passageway 46. Since the extended rod member 64 is moved away from the cone end of the fitting by unthreading the upper body 14, the end surface 84 of the rod member may no longer engage the ball 20. The force of the spring 22 would otherwise bias the ball into engagement with the seating surface 21, but the fluid pressure of the injected lubricant can force the ball out of engagement with the seating surface and the fluid may flow through passageway 48 of the main body and around ball 20.

The shape of the spring 22 will be discussed in further detail below. At present, it will be understood that the lubricant can continue through passageway 48 by passing through the center of the spring 22. The auto-clave cone 86 having conical shaped portion 88 may be held into engagement with seating surface 89 on the threaded end of the main body, and out of engagement with the lip 34, since the main body 12 has been fully threaded to the general assembly. The lubricant may enter the lubrication system of the general assembly to be lubricated by passing through the passageway 87 in the auto-clave cone 86.

It is also possible according to the present invention to provide a valve assembly or stinger assembly without an extended rod member. In this case, an additional seal may be made between the ball 20 and the seating surface 21 when the valve is in the closed position. When fluid is injected through the fitting, the conical-shaped portion or valve portion 62 would be out of engagement with the surface 45, and the force of the injected lubricant would unseat the ball 20 from its seating surface 21.

The purpose of the extended rod portion 64 of the stinger assembly is to enable pressure within the fitting and pressure within the general assembly to be lubricated to be safely bled off with the present fitting. It will be apparent that if the cap 16 is partially unthreaded from the upper body, and subsequently the upper body is unthreaded one or two turns from the main body, the stinger assembly will be moved axially away from the seating surface 45, and yet the extended rod portion 64 will keep the ball 20 from engaging seating surface 21. In this "bleed-off" condition, pressure may freely pass through the cone, past the ball and the conical-shaped portion 62, through the stinger assembly, and out the vent passageway 39 in the cap.

In this bleed-off position, it is possible to inject lubricant through the fitting by totally unthreading the cap and threading a suitable lubricant connection to the upper body. Although lubricant may be injected through the fitting in this position, the injected fluid pressure will generally have to be high because of the force required to make the lubricant pass between the conical-shaped portion 62 and the seating surface 45. Accordingly, the upper body will typically be unthreaded a few more turns, i.e., 3-4 turns, from the main body before lubricant is injected through the fitting. In this latter position, as shown in FIG. 2, the extended rod 64 is no longer in engagement with the ball, and the spring normally biases the ball into engagement with seating surface 21.

The valve assembly or stinger assembly 18 will now be described in further detail. The stinger assembly comprises a generally cylindrical-shaped body portion 60, and an expanded portion 76 and conical-shaped portions 78 and 80. One or more exit passageways 68 may be formed adjacent the conical-shaped portion 62, which allows lubricant to flow down the central axis passageway 23 of the stinger assembly 18 and out the openings 68. The extended rod member 64 is secured to the conical-shaped portion 62, and generally acts to engage the ball 20 and prevent the ball from forming a seal with the seating surface 45 when it is desired to bleed-off the fitting. When lubricant is injected through the fitting, the extended rod portion is generally out of engagement with the ball, as shown in FIG. 2. The stinger assembly 18 also includes an O-ring assembly 26, consisting of O-ring 72 and a pair of metallic washers 74 within a suitable groove in the generally cylindrical body 60. The outer diameter of the body 60 is only slightly smaller than the diameter of the generally cylindrical passageway 44 in the main body, and the O-ring assembly 26 therefore forms a fluid tight sliding seal against the surface 70 of the main body. The surface 70 in sliding engagement with the O-ring assembly 26 is cylindrical, since the stinger assembly may freely rotate with respect to the upper body before the upper body is threaded to the main body. However, since the stinger assembly generally does not rotate with respect to the main body while the upper body is threaded to the main body, there is little if any rotational movement of the O-ring assembly 26 relative to the main body when the stinger assembly is being moved axially into engagement with the seating surface 45. Accordingly, the life of the O-ring seal is extended since there is less wear to the O-ring as the upper body is threaded to the main body.

A suitable fitting according to the present invention may be provided with a cone 86 containing a conical-shaped portion 88, which is designed for engagement with a suitable female portion of the general assembly to be lubricated. Thus, a metal-to-metal seal is formed between the portion 88 and the female receptical of the general assembly. The cone 86 is axially movable relative to the body 12 and rotatable with respect to the body, so that galling of the portion 88 is prevented as the main body 12 is threaded to the general assembly.

A fluid-tight seal may not exist under high pressure between the general assembly to be lubricated and the threads 32 on the main body. However, it is a feature of the present invention to provide a cone with a conical-shaped portion for sealing engagement with the general assembly to be lubricated, and the cone is rotatable and axially movable with respect to the main body of the fitting as the fitting is threaded to the general assembly. A fluid-tight metal-to-metal seal is also formed between the cone 86 and the seating surface 89 on the main body when the main body has been fully threaded to the general assembly. This seal involving seating surface 89 prevents lubricant from traveling back around the cone 86 and out interstices through the threads 32 once the fitting has been fully threaded to the general assembly to be lubricated.

Fittings, according to the present invention, may be specifically adapted for use with a grease/polyester plasticizer mixture. The polyester plasticizer particles in the mixture may effectively function as an automatically replaced packing material, which is carried to its intended location within a general assembly by the grease or other lubricant. The particles are often, but need not be, true plasticizers, and typical particles may be formed of asbestos, mico, gypsium, fiberglass, nylon, Teflon TM or other materials suitable as a packing. Typically, the particles are fibrous and may have a mean diameter range of 0.010 inch to 0.030 inch. The particles are not of uniform size, however, and some fibrous particles having greater diameters and others with smaller diameters would generally be included. A suitable grease/packing material mixture which may be used in conjunction with the fittings is sold by the Chemola Division of Hi-Port Industries, Inc. in Highlands, Tex., under the tradename "Polymel-Pack".

Figure 3:
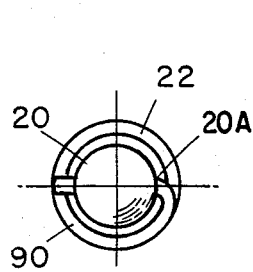
FIG. 3 is an end view of the ball and spring shown in FIGS. 1 and 2.

In FIG. 3, it may be seen that the end of the spring 22 in contact with the ball 20 is provided with a leg portion 20A, so that it is a leg portion one of the spring which is actually forcing the ball towards its seated position. Also, the leg portion 20A passes through the axis of the passageway 46, so that when the ball 20 becomes unseated, the ball will move radially into contact with the wall of the passageway 48.

The spring 22 has its outer diameter approximating the diameter of the passageway 48 so that the passageway also functions as a guide for preventing substantial radial movement of the coils of the spring. When the ball 20 is unseated, larger particles can pass by the ball than is possible when the unseated ball remains substantially aligned with the axis of the passageway 48. The lubricant/plasticizer mixture therefore does not have to pass between the various coils of the springs, but rather enters the central opening through the spring between the ball and the adjacent coil 90 of the spring. The particles in the lubricant mixture therefore do not tend to become plugged in the area of the ball and the spring, so that the likelihood of having a detrimental plugged fitting is substantially eliminated. Also, serious blowout problems are avoided since the fitting does not tend to plug and less pressure is required to force the mixture through the fitting. The spring 22 utilized in the fitting of a present invention is thus particularly suited to prevent plugging of the fitting with lubricant and/or plasticizer particles. In some respects, the spring 22 and fitting are similar to the spring and fitting described in the parent application, Ser. No. 124,444, now U.S. Pat. No. 4,347,915, which disclosure is hereby incorporated by reference.

In one major respect, the spring has been modified from the spring disclosed in the parent application. As shown in FIG. 3, the leg 20A of the spring extends over a portion of the coil immediately below the spring. Because fluid is injected through the fitting under high pressure, it may be seen that the ball may be forced toward the cone and that the spring will be compressed. It is an important feature of the present invention that the ball engage a single point on the leg of the spring, and not the leg of the spring and one or more points on the coil of the spring. This ensures that the ball will always be shifted off the axis of the passageway 46 and into engagement with the side wall of passageway 48, allowing lubricant to flow through the middle of the spring. If the ball were not shifted into engagement with the side wall of the passageway 48 but would remain substantially aligned with the axis of the passageway, it may be seen that the ball may block lubricant from freely passing down the middle of the spring. In that event, lubricant may flow between the coils of the spring and the side walls of the passageway 48, which might tend to plug the passageway and cause the fitting to blow-out. Moreover, it may be seen that movement of the ball into engagement with the side wall of the passageway 48 optimizes the flow clearance around the ball, so that the lubricant and plasticizer particles can more easily flow past the ball and through the center of the spring without plugging the fitting.

The leg 20A of applicant's spring, the diameter of the spring wire, the outer diameter of the generally cylindrical spring and the space between the tip of the leg of the spring and the adjacent the coil portion of the spring are controlled so that the free end of the leg of the spring, if deflected by the injected fluid force acting on the ball, cannot deflect past the adjacent coil of the spring. It is preferable that the axis of the generally cylindrical leg of the spring be perpendicular to the central axis of the spring, although all that is required is that the leg of the spring pass through the axis of the seating surface 21.

It is a particular feature of the present invention to provide a lubricant fitting with a ball and seating surface, as previously described, wherein the ball is biased toward the seating surface by a spring, and a leg of the spring contacting the ball passes through the axis of the seating surface and the free end or tip of the leg contacts the adjacent coil of the spring.

Figure 4:
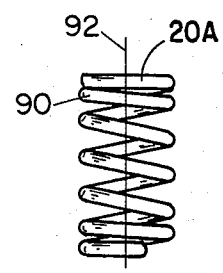
FIG. 4 is a side view of the spring shown in FIG. 3.

As shown in FIG. 4, the free end of the leg 20A is in engagement with the adjacent coil 90 of the spring. Thus, the free end is prohibited from deflecting past the adjacent coil of the spring when lubricant is injected through the fitting and the ball becomes unseated. Moreover, the leg of the spring cannot be appreciably deflected relative to the central axis 92 of the cylindrical shaped spring, and the leg 20A passes through the central axis of the spring. Since the leg is circular in cross-section this ensures that the ball will frequently be shifted to one side of the passageway with respect to the leg of the spring, and at other times will be shifted to the other side of the passageway with respect to the leg of the spring. Moreover, since the leg of the spring is preferably perpendicular to the central axis of the spring, nothing prohibits the ball from moving into engagement with the side walls of the passageway in a direction at least partially parallel to the direction of the axis of the leg of the spring. Thus, wear on the ball tends to be more uniform and the life of the seal between the ball and the seat is enhanced since the ball can freely move to different positions relative to the main body when unseated.

Thus, the spring 22 including leg 20A of the fitting are especially designed so that lubricant and plasticizer can freely flow past the ball and through the center of the spring without plugging the fitting. When fluid is injected through the fitting and the ball becomes unseated, the coils of the spring will begin to compress. If the free end of the leg of the spring is in engagement with the adjacent coil of the spring, the ball may shift to either side of the passageway and the leg of the spring will not be bent or deflected. If the free end of the spring is not in engagement with the adjacent coil of the spring, but the length of the leg, the diameter of the spring wire, the space between the tip of the leg of the spring and the adjacent coil, and the outer diameter of the cylindrical shaped spring are controlled, the tip of the leg may be deflected, but only to the point that the tip of the leg engages the adjacent coil of the spring. If the fluid force acting on the ball is sufficient to deflect the leg of the spring, the leg 20A can only deflect to the point that the tip of the leg engages the adjacent coil 90 of the spring. Thereafter, it may be possible to further compress the spring, but the leg 20A will not deflect so that the ball might engage a point on the spring other than the single point on the generally cylindrical leg 20A.

A fitting with a ball and seating surface according to the present invention, and with the spring containing a leg member as described above is thus superior to the device with the spring shown in French Pat. No. 1,115,975. In the referenced patent, the free end of the leg of the spring is not in engagement wth the adjacent coil of the spring. Moreover, the length of the leg of the spring, the diameter of the spring wire, the spacing between the free end of the leg and the adjacent coil of the spring, and the outer diameter of the spring are not controlled so that the tip of the leg will engage the adjacent coil of the spring as the spring is compressed.

Applicant's device is particularly suitable for injecting lubricant into a general assembly under very high pressure. As previously noted, it is important that the ball only engage a single point on the leg of the spring, and not engage another coil portion of the spring, since the ball must always be made to engage the side walls of the passageway when not seated. The spring as described herein allows lubricant to be injected under high pressure, because the top of the leg will always engage the adjacent coil of the spring and cannot deflect past that point. Moreover, it is preferable that the tip of the leg of the spring always be in engagement with the adjacent coil of the spring so that the ball may freely shift to either side of the leg. If the leg must be bent before the free end is in engagement with the adjacent coil portion, the leg will no longer be perpendicular to the central axis of the spring, and the ball will always deflect toward the bent free end of the leg, which is not desirable.

The lip 34 in the main body may be designed to be thicker or heavier than similar lips of fittings commonly found in the prior art. Typically, lip 34 must be relatively thin so that, after the cone is placed within the fitting, the lip may be crimped over to hold the cone in place. According to the present invention, however, a relatively thicker lip 34 may be provided, which is not crimped over the cone in a single operation. Rather, the relatively thicker lip is bent in place by an orbital riveting technique, whereby only a portion of the annular lip is cold worked by a riveter at any point in time. With the orbital riveting technique, a heavier or thicker lip can thus be formed without cracking or otherwise substantially weakening the lip. The same technique may be used to form the lip 15 for the upper body 14.

The fitting tip member or cone 86 is axially movable within the passageway 50 and freely rotatable with respect to the body member 12. As the body member 12 is threaded to the device to be lubricated, the cone 86 need not rotate. As the conical portion 88 engages the device, galling of the metal-to-metal seal is thereby prevented. Thus, any eccentricity between the conical-shaped portion 88 and the female surface of the device will not cause galling of either the cone 86 or the receiving female surface of the device to be lubricated. When the fitting has been fully threaded to the device to be lubricated a fluid-tight metal-to-metal seal is formed between the cone 86 and the seating surface 89, which prevents lubricant from leaking out past the threads 32.

The operation of the fitting according to the present invention will now be briefly described. In its normal condition, the fitting is threaded to the general assembly by threads 32. The upper body 14 is threaded into the main body so that the conical-shaped portion 62 is in sealing engagement with the seating surface 45 of the main body. An additional seal is provided between the conical portion 41 of the cap 16 and the seating surface 43 on the upper body 14. The O-ring seal 26 and the seal formed with the conical-shaped portion 80 and the seating surface 47 prevent lubricant from leaking out past the threads 36 between the main body and the upper body.

When it is desired to insert additional lubricant through the fitting, the cap 16 is partially unthreaded relative to the upper body 14. Any fluid pressure within the upper body may therefore be vented through vent holes 11 in the cap. Assuming the seal between the portion 62 and the surface 45 is fluid-tight, lubricant will not flow out the vent hole 11 after the initial pressure within the upper body is released.

The upper body 14 may then be unthreaded relative to the main body 12, so that the conical-shaped portion 62 is moved out of engagement with the seating surface 45. At the same time, the spring 22 will urge the ball 20 into sealing engagement with the seating surface 21, thereby forming a fluid-tight seal to keep lubricant within the general assembly. After the upper body 14 has been unthreaded several turns and additional fluid is not escaping through the vent hole 11, the cap 16 may be removed and a suitable lubricant adaptor threaded to the upper body by threads 40. Alternatively, the upper body may be unthreaded to the point that the portion 62 is out of engagement with its seating surface, but the extended rod portion 64 keeps the ball from sealing engagement with surface 21. In this event, the lubricant pressure within the general assenbly may be relieved before the cap is removed and the lubricant adaptor threaded to the upper body.

Referring now to FIG. 2, it may be seen that pressurized lubricant may be forced through passageway 42, through the passageway 23 of the stinger assembly 18, through the passageway 46 (causing the ball 20 to move out of engagement with the seating surface 11 and into engagement with the side wall of the passage 48), through the center of the spring, through the passageway 87 in the cone, and thereafter into the general assembly to be lubricated. When sufficient lubricate has been injected into the general assembly, the upper body 14 may be threaded to the main body 12 causing the conical portion 62 to form a fluid-tight seal with the seating surface 45. Thereafter, the lubricant injector adaptor 13 may be removed from the threads 40, and the cap 16 may be rethreaded to the upper body 14 so that a fluid-tight seal is formed between the portion 41 and the seating surface 43.

Figure 5:
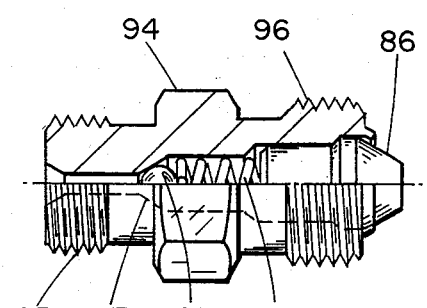
FIG. 5 is a pictorial representation, partly in cross-section of another embodiment of the present invention with the spring shown in FIGS. 3 and 4.

The fitting tip member 86 as shown in FIG. 2 and the spring as shown in FIGS. 3 and 4 are suitable for use in a blowdown-type fitting, but may also be used in any lubricant fitting with a ball and a seating surface, such as the fittings described in the parent application, Ser. No. 124,444. The cone 86 and the spring 22 may be used in a button head-type fitting, as shown in FIGS. 4 and 6 of the parent application, and may also be used in a packing injector type fitting, as shown in FIGS. 5 and 7 of the parent application. Also, it may be appreciated that the cone 86 as described herein is rotatable and linearly movable with respect to the body of the fitting, and the cone may be used in a single check fitting, or a double check fitting with two balls in series with two respective springs and two seating surfaces.

Although one skilled in the art will readily understand how the cone 86 and spring 22 as described herein can be accommodated to any type lubricant fitting as described above, one such embodiment is shown in FIG. 5 for a single check conventional lubricant fitting, which may be used with a vent cap (not shown). The fitting body 94 has threads 95 for receiving the vent cap, or for receiving a lubricant adaptor, and threads 96 for screwing the body to the device to be lubricated. The body has a passageway through the fitting for accommodating a ball 20, a spring 22, and a tip member 86 as previously described. The passageway forms seating surface 97 for sealing engagement with the ball. The cone or tip member 86 is rotatable with resect to the body 94 and radially movable in the passageway, as previously described. Also, the leg of the spring is in engagement with the ball, and is preferably formed in that the free end of the leg of the spring is in engagement with the adjacent coil of the spring, as shown in FIG. 4.

It is a feature of the present invention that the ball 20 automatically return to its seated position, e.g., against the seating surface 21 or 97, when lubricant is not being injected through the fitting and the ball is not prevented from seating by engaging the rod member 64. It is also a feature of the invention that the fitting create a minimum back pressure on the lubricant injection device, and that the retainer 34 for the ball 20, the spring 22, and the cone 86 be subjected to a minimum pressure as lubricant is injected through the fitting. It is not necessary that the spring 22 be totally compressed to allow lubricant and plasticizer particles to pass through the fitting, which may prolong the life of the spring.

In order to minimize the likelihood that the ball will become trapped against the side wall of a passageway and not return to its seated condition, the angle between the seating surface and the side wall of the passageway containing the spring is preferably 135° or greater. In order to minimize the pressure required to pass lubricant through the fitting, the cross-sectional area difference (A1) between the passageway 48 minus the cross-sectional area of a ball 20 is preferably at least as large as the cross-sectional area of the restricted passageway 46 (A2). Thus, the flow through the area past the ball (A1) in its unseated condition is at least as large as the area of the restricted passageway (A2) upstream of the ball, and preferably A1 is between 10% and 50% larger than A2. Of course, the cross-sectional area of the ball must be large enough to prevent the ball from moving past the leg portion of the spring and between the coils of the spring, and should also be large enough to prevent the ball from being trapped against the side of a passageway 48.

The passageway of the fitting need not be cylindrical or straight to utilize the concepts of this invention. As long as the passageway of adequate cross-section is provided, the passageway may form a 45° or 90° angle so that a grease gun or lubricant fitting may be more easily connected to the fitting for adding lubrication. It is within the concept of this invention to use any conventional means to secure the fitting to the general assembly or mechanical device, and threads have been illustrated as one technique for accomplishing this purpose. The body of the fitting is preferably fabricated from steel, and may be plated by conventional techniques if desired. The fitting may be used for a variety of lubricants, but is especially suitable for any mixture having solid particles which might plug conventional fittings.

Other alternative forms of the present invention will suggest themselves from a consideration of the apparatus and techniques hereinbefore discussed. Accordingly, it should be fully understood that the apparatus and techniques depicted in the accompanying drawings, and described in the foregoing explanation, are intended as exemplary embodiments of the invention and not as limitations thereto.

What is claimed is:

1. A fitting for allowing lubricant to enter a device and retain said lubricant within said device, comprising:
   a main body member having a first passageway extending through said body member;
   said first passageway defining first and second seating surfaces;
   connection means on one end of said main body member for securing said main body member to a receiving aperture in said device;
   a ball member within said first passageway for sealing engagement with said first seating surface;
   spring means within said first passageway for biasing said ball member toward said first seating surface;
   an upper body member rotatably secured to another end of said main body member and having a second passageway extending through said upper body member;
   a valve assembly at least partially disposed within both said first and second passageways and rotatable with respect to said upper body member and axially movable within said upper body member in response to lubricant pressure;
   a valve portion of said valve assembly for sealing engagement with said second seating surface in response to rotation of said upper body member relative to said main body member;
   main body sealing means for establishing a fluid tight seal between said valve assembly and a cylindrical surface defined by said first passageway through said main body member;
   said valve assembly having a third passageway extending through at least a portion of said valve assembly and past said main body sealing means.

2. A fitting as defined in claim 1, said upper body member further comprising:
   an annular lip for retaining at least a portion of said valve assembly within said upper body member and limiting axial movement of said valve assembly while passing lubricant through said fitting.

3. A fitting a defined in claim 1, wherein said valve portion of said valve assembly is a conical-shaped valve portion, and said valve portion is spaced between said third passageway and said ball member.

4. A fitting as defined in claim 1, wherein said valve assembly further comprises:
   an extended rod portion for selectively preventing said ball member from sealing engagement with said first seating surface.

5. A fitting as defined in claim 1, wherein said main body sealing means is an O-ring seal positioned on said valve assembly.

6. A fitting as defined in claim 1, said upper body member further comprising:
   upper body sealing means for establishing a fluid tight seal between said valve assembly and said upper body member.

7. A fitting as defined in claim 1, wherein said spring means further comprises:
   a leg member in contact with said ball member and passing through the axis of said first seating surface for diverting said ball member out of alignment with said axis of said first seating surface when said ball member is out of engagement with said first seating surface.

8. A fitting as defined in claim 7, wherein said spring means is a cylindrical shaped helical spring, and a free end of said leg member is in engagement with an adjacent coil portion of said spring.

9. A fitting as defined in claim 7, further comprising:
   said spring means is disposed within a portion of said first passageway defining a cylindrical chamber; and
   said first seating surface intersects a sidewall of said cylindrical chamber at an angle of at least 135°.

10. A fitting as defined in claim 9, wherein the area difference between the cross-sectional area of said cylindrical passageway and the cross-sectional area of said ball member is greater than the minimum cross-sectional area of said first passageway.

11. A fitting as defined in claim 10, wherein said cross-sectional area difference is between 10% and 50% greater than said minimum cross-sectional area of said first passageway.

12. A fitting for allowing lubricant to enter a device and retain said lubricant within said device, comprising:
    a main body member having a first passageway extending through said body member;
    said first passageway defining first and second seating surfaces;
    connection means on one end of said main body member for securing said main body member to a receiving aperture in said device;
    a ball member within said first passageway for sealing engagement with said first seating surface;
    spring means within said first passageway for biasing said ball member toward said first seating surface;
    an upper body member rotatably secured to another end of said main body member and having a second passageway extending through said upper body member;
    a valve assembly at least partially disposed within both said first and second passageways and rotatable with respect to said upper body member and axially movable within said upper body member in response to lubricant pressure;
    a valve portion of said valve assembly for sealing engagement with said second seating surface in response to rotation of said upper body member relative to said main body member;
    main body sealing means for establishing a fluid tight seal between said valve assembly and a cylindrical surface defined by said first passageway through said main body member;
    said valve assembly having a third passageway extending through at least a portion of said valve assembly and past said main body sealing means;

a cone member adjacent said one end of said main body member and within said first passageway and having a fourth passageway extending through said cone member;

said first passageway defining a fourth seating surface;

said cone member is axially movable with respect to said main body member for sealing engagement with said fourth seating surface while said main body member is securely connected to said device to be lubricated; and said cone member is retained by and rotatable with respect to said main body member.

13. A fitting as defined in claim 12, said upper body member further comprising:

an annular lip for retaining at least a portion of said valve assembly within said upper body member and limiting axial movement of said valve assembly while passing lubricant through said fitting.

14. A fitting as defined in claim 12, said upper body member further comprising:

upper body sealing means for establishing a fluid tight seal between said valve assembly and said upper body member.

15. A fitting as defined in claim 12, wherein said spring means further comprises:

a leg member in contact with said ball member and passing through the axis of said first seating surface for diverting said ball member out of alignment with said axis of said first seating surface when said ball member is out of engagement with said first seating surface.

16. A fitting as defined in claim 15, wherein said spring means is a cylindrical shaped helical spring, and a free end of said leg member is in engagement with an adjacent coil portion of said spring.

17. A fitting as defined in claim 15, further comprising:

said spring means is disposed within a portion of said first passagway defining a cylindrical chamber; and said first seating surface intersects a sidewall of said cylindrical chamber at an angle of at least 135°.

18. A fitting as defined in claim 15, wherein the area difference between the cross-sectional area of said cylindrical passageway and the cross-sectional area of said ball member is greater than the minimum cross-sectional area of said first passageway.

19. A fitting for allowing lubricant to enter a device and retain said lubricant within said device, comprising:

a main body member having a first passageway extending through said body member;

said first passageway defining first and second seating surfaces;

connection means on one end of said main body member for securing said main body member to a receiving aperture in said device;

a ball member within said first passageway for sealing engagement with said first seating surface;

spring means within said first passageway for biasing said ball member toward said first seating surface;

an upper body member rotatably secured to another end of said main body member and having a second passageway extending through said upper body member;

a valve assembly at least partially disposed within both said first and second passageways and rotatable with respect to said upper body member and axially movable within said upper body member in response to lubricant pressure;

a valve portion of said valve assembly for sealing engagement with said second seating surface in response to rotation of said upper body member relative to said main body member;

main body sealing means for establishing a fluid tight seal between said valve assembly and a cylindrical surface defined by said first passageway through said main body member;

said valve assembly having a third passageway extending through at least a portion of said valve assembly and past said main body sealing means;

a cap member rotatably secured to said upper body member and having at least one aperture for venting pressure from said second passageway; and said cap member including a cap valve for engagement with a third seating surface defined by said second passageway.

20. A fitting as defined in claim 19, said upper body member further comprising:

an annular lip for retaining at least a portion of said valve assembly within said upper body member and limiting axial movement of said valve assembly while passing lubricant through said fitting.

* * * * *